United States Patent [19]

Falk

[11] 4,252,379
[45] Feb. 24, 1981

[54] BRAKE PRESSURE CONTROL VALVE INCLUDING FAILURE WARNING MECHANISM

[75] Inventor: Edward J. Falk, St. Louis, Mo.

[73] Assignee: Wagner Electric Corporation, Parsippany, N.J.

[21] Appl. No.: 105,385

[22] Filed: Dec. 19, 1979

Related U.S. Application Data

[63] Continuation of Ser. No. 960,872, Nov. 15, 1978, abandoned.

[51] Int. Cl.³ .......................... B60T 8/18; B60T 8/26
[52] U.S. Cl. ..................................... 303/6 C; 188/349
[58] Field of Search .............. 303/6 C, 22 R, 24 A, 303/24 C, 24 F, 84 R, 84 A, 92; 188/195, 345, 349

[56] References Cited

U.S. PATENT DOCUMENTS

| | | | |
|---|---|---|---|
| 3,727,989 | 4/1973 | Keady | 303/6 C |
| 3,729,237 | 4/1973 | Ishikawa et al. | 303/84 A |
| 3,788,710 | 1/1974 | Grunberg et al. | 303/92 X |
| 4,049,323 | 9/1977 | Hess | 303/22 R X |
| 4,085,978 | 4/1978 | Nogami | 303/24 F X |

Primary Examiner—Douglas C. Butler
Attorney, Agent, or Firm—D. F. Marquette

[57] ABSTRACT

A pressure control valve for use in vehicle hydraulic diagonal split brake systems. The valve includes two valve pistons which operate to limit the fluid pressure delivered to the rear wheel brakes relative to that delivered to the front wheel brakes. The valve also includes a failure warning mechanism having a switch actuating piston. In the event of a failure in one branch of the diagonal split brake system, the switch actuating piston operates to simultaneously preclude the two valve pistons from limiting the rear wheel brake pressure so that the rear wheel brake in the unfailed branch of the brake system can develop the maximum braking effort for vehicle emergency braking.

1 Claim, 6 Drawing Figures

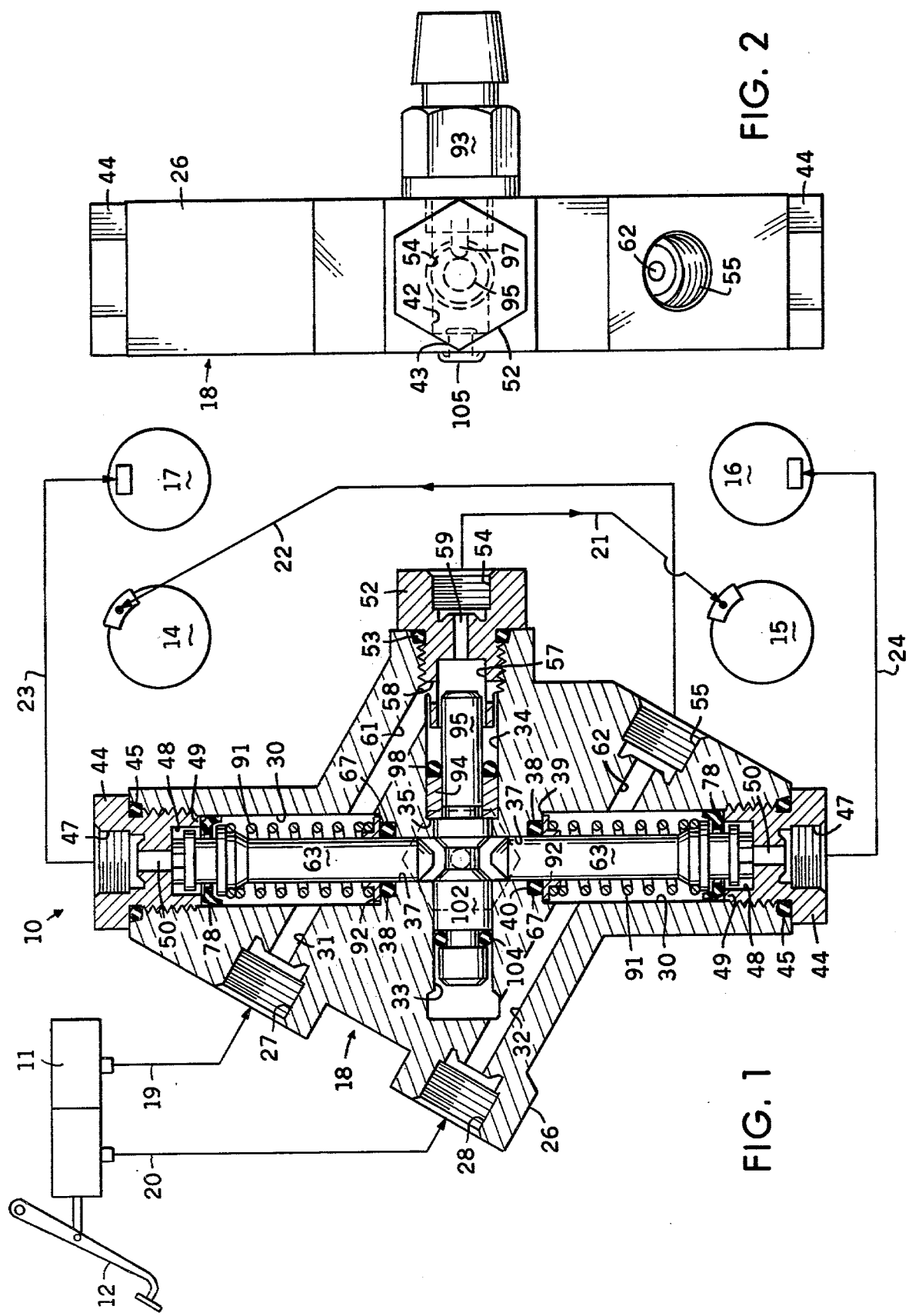

BRAKE PRESSURE CONTROL VALVE INCLUDING FAILURE WARNING MECHANISM

This is a continuation of application Ser. No. 960,872, filed Nov. 15, 1978 now abandoned.

BACKGROUND OF THE INVENTION

Vehicle hydraulic dual brake systems have included pressure control valves for reducing the potential for premature rear wheel lock during braking. These pressure control valves generally limit the rear wheel brake pressure relative to the front wheel brake pressure in order to reduce the rear wheel brake torque and thus prevent premature rear wheel lock. A drawback of the type of pressure control valve which is used in a diagonal split brake system is that, in the event of failure in one branch of the brake system, the pressure control valve continues to limit the rear wheel brake pressure in the unfailed branch of the brake system thereby reducing the available remaining rear wheel brake torque that is then needed for emergency braking. Therefore, it is an object of this invention to provide a pressure control valve for diagonal split brake systems which limits the rear wheel brake pressure relative to the front wheel brake pressure during normal braking but which precludes the limiting of the rear wheel brake pressure in the event of partial brake system failure so that the rear wheel brake which is disposed in the unfailed branch of the brake system can develop the maximum brake torque for emergency braking.

SUMMARY OF THE INVENTION

The control valve of the present invention is designed for use in vehicle hydraulic dual brake systems of the type which include a tandem master cylinder having first and second separated portions supplying fluid pressure to first and second separated wheel brakes, respectively, through first and second separated fluid branches, respectively. The control valve includes first and second inlets for connection to the first and second tandem master cylinder separated portions, respectively, and first and second outlets for connection to the first and second separated wheel brakes, respectively. The control valve also includes first valve means which will be disposed in the first fluid branch of the dual brake system to transmit fluid pressure at the first inlet to the first outlet and to limit the fluid pressure transmitted to the first outlet relative to the fluid pressure at the first inlet when the fluid pressure at the first inlet is above a predetermined level. The control valve further includes second valve means which will be disposed in the second fluid branch of the dual brake system to transmit fluid pressure at the second inlet to the second outlet and to limit the fluid pressure transmitted to the second outlet relative to the fluid pressure at the second inlet when the fluid pressure at the second inlet is above the predetermined level. The control valve also includes inhibiting means which simultaneously precludes the first and second valve means from limiting the fluid pressure transmitted from the first and second inlets to the first and second outlets, respectively, when a failure occurs in one of the first and second fluid branches of the dual brake system.

BRIEF DESCRIPTION OF THE DRAWINGS

FIG. 1 is a schematic view of a portion of a dual brake system incorporating a control valve which embodies the present invention shown in vertical section;

FIG. 2 is a side elevation view of the control valve of FIG. 1;

DESCRIPTION OF THE PREFERRED EMBODIMENT

Figure 1A:
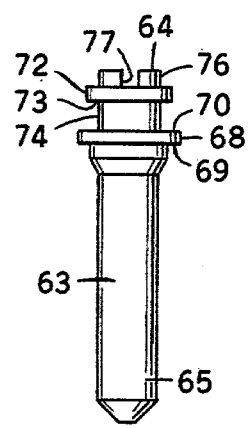
FIG. 1a is a view of one of the parts of the control valve of FIG. 1.

Referring to FIG. 1, a portion of a diagonal split brake system is generally illustrated at 10 and includes standard components such as a tandem master cylinder 11 operated by a brake pedal 12. The brake system portion 10 also includes front wheel brakes 14, 15 and rear wheel brakes 16, 17. A control valve, indicated generally at 18, is interposed between the master cylinder 11 and the front and rear wheel brakes 14-17. Brake fluid is delivered from the master cylinder 11 to the control valve 18 via the conduits 19, 20. Brake fluid is then delivered to the front wheel brakes 14, 15 from the control valve 18 via the conduits 21, 22. Likewise, brake fluid is delivered to the rear wheel brakes 16, 17 from the control valve 18 via the conduits 23, 24.

The control valve 18 includes a housing 26, preferably formed of a suitable metal, having inlet openings 27, 28 for receiving the conduits 19, 20 respectively. The housing 26 includes identical axially aligned cavities 30. Passages 31, 32 connect the inlet openings 27, 28 with the cavities 30. The housing 26 includes a bore 33, intersecting the passage 32, and a counterbore 34. A shoulder 35 is formed between the bore 33 and the counterbore 34. Axially aligned bores 37, which intersect the bore 33, and counterbores 38 connect the cavities 30 with the bore 33. Each counterbore 38 defines annular shoulders 39, 40. The housing 26 also includes a cross bore 42 which intersects the bore 33 at the same location on its axis as the bore 37. A passage 43 extends from the closed end of the bore 42 through the side of the housing 26.

Fittings 44 are threadedly received in the outer ends of the cavities 30, respectively. O-ring seals 45 are disposed between the housing 26 and the fittings 44. The fittings 44 include outlet openings 47 for receiving the conduits 23, 24. Each fitting 44 also includes a central bore 48 which defines a peripheral wall having an annular end surface 49. Each fitting 44 further includes a fluid passage 50 connecting the central bore 48 and the outlet opening 47. A fitting 52 is threadedly received in the outer end of the counterbore 34. An O-ring seal 53 is disposed between the housing 26 and the fitting 52. The fitting 52 includes an outlet opening 54 for receiving the conduit 21, and the housing 26 includes an outlet opening 55 for receiving the conduit 22. The fitting 52 includes a central bore 57 defining a peripheral wall with fluid passages 58 extending therethrough. The fitting 52 also includes a fluid passage 59 connecting the central bore 57 and the outlet opening 54. A fluid passage 61 connects one cavity 30 and the counterbore 34, and a fluid passage 62 connects the other cavity 30 and the outlet opening 55.

Referring also to FIG. 1a, a movable valve member such as a valve piston 63 is disposed in each of the cavities 30. Each valve piston 63 has its end portions 64, 65 slidably disposed in the respective fitting bore 48 and housing bore 37. An O-ring seal 67 is provided in each housing counterbore 38 contacting the respective annular shoulder 40 and valve piston end portion 65 to prevent fluid flow from the cavities 30 into the bore 33.

Each valve piston 63 includes a radially extending annular flange 68 having an annular shoulder 69 on one side and an annular shoulder 70 on the other side thereof. Each valve piston 63 further includes an enlarged portion 72 extending radially outwardly and having a rounded annular shoulder 73 which forms a valve head. The outside diameter of the enlarged portions 72 is slightly less than the diameter of the bores 48 of the fittings 44 so as to allow fluid flow around the enlarged portions 72. Each valve piston 63 also includes a reduced diameter cylindrical portion 74 between the annular shoulders 70, 73. Each valve piston 63 further includes a cylindrical end portion 76 having a notch 77 extending transversely therethrough to allow fluid flow.

Figure 3:
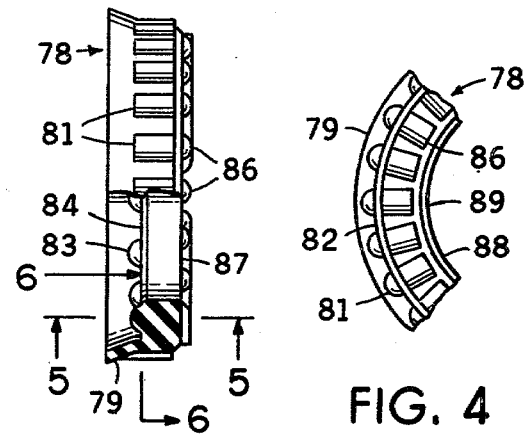
FIG. 3 is an enlarged view, partly in section and partly in elevation, of one of the parts of the control valve of FIG. 1.
Figure 4:
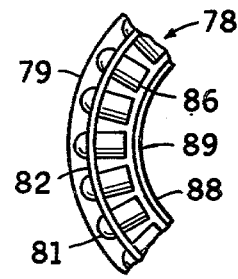
FIG. 4 is an end view of the part illustrated in FIG. 3.

Referring also to FIGS. 3-6, a stationary valve member such as an elastomeric valve element 78 is disposed in each of the cavities 30 and surrounds the reduced cylindrical portion 74 of the associated valve piston 63. When the valve elements 78 are in the position shown in FIG. 1, they engage the walls of the cavities 30 and the annular end surfaces 49 of the fittings 44. As seen in FIGS. 3 and 4, each valve element 78 has a lip 79 which extends outwardly when the valve element 78 is in its free state. When the valve elements 78 are installed in the cavities 30, the lips 79 are forced inwardly and, consequently, form seals against the walls of the cavities 30 to prevent fluid flow around the lips 79 from the cavities 30 to the outlet openings 47.

Each valve element 78 includes a plurality of angularly spaced ribs 81 which extend radially from the outer peripheral surface 82 thereof. Each valve element 78 further includes a plurality of semispherical bosses 83 which extend from the side 84 thereof for engagement with the annular shoulder 70 of the associated valve piston 63. The spaces between the bosses 83 of the valve elements 78 define fluid passages for fluid flow from the inlet openings 27, 28 to the outlet openings 47. Each valve element 78 also includes a plurality of angularly spaced ribs 86 which extend from the side 87 thereof for contacting the annular end surface 49 of the associated fitting 44. As seen in FIG. 4, the ribs 86 of the valve elements 78 are angularly aligned with the ribs 81 thereof to allow fluid flow around the lips 79 from the outlet openings 47 to the cavities 30. As also seen in FIG. 4, each valve element 78 further includes a rounded portion 88 adjacent the end of its inner peripheral surface 89 for engaging the annular shoulder 73 or valve head of the associated valve piston 63. The rounded portions 88 form valve seats.

When the control valve 18 is assembled as shown in FIG. 1, it will be seen that the diameter of the reduced portions 74 of the valve pistons 63 is less than the diameter of the inner peripheral surfaces 89 of the valve elements 78 so as to define annular fluid passages therebetween. Also, the outer diameter of the flanges 68 of the valve pistons 63 is less than the inside diameter of the lips 79 of the valve elements 78 thereby defining annular fluid passages therebetween. These fluid passages combined with the previously mentioned fluid passages between the bosses 83 of the valve elements 78 define direct fluid paths for fluid flow between the valve pistons 63 and the valve elements 78.

Each valve piston 63 is normally urged outwardly in FIG. 1 toward the associated outlet opening 47 by a coil spring 91 so that the end surface of its cylindrical portion 76 engages the end of the bore 48 of the associated fitting 44. Since each valve piston 63 is normally urged outwardly, a fluid passage is normally formed between each associated valve head 73 and valve seat 88. One end of each coil spring 91 engages the annular shoulder 69 on the flange 68 of the associated valve piston 63. The other end of each coil spring 91 engages a retaining ring 92. The retaining rings 92 rest against the annular shoulders 39 of the cavities 30 and surround the end portions 65 of the valve pistons 63. The retaining rings 92 maintain the O-ring seals 67 in the housing counterbores 38.

With the valve pistons 63 in the positions shown in FIG. 1, the fluid pressure at the outlet openings 47 will be equal to the fluid pressure at the inlet openings 27, 28 or in the master cylinder 11. The operation of the valve pistons 63 and the valve elements 78 to provide restricted fluid passages to the outlet openings 47 will be explained hereafter. However, it will be noted that the coil springs 91 determine at what fluid pressure level the valve pistons 63 and the valve elements 78 will begin to restrict the fluid passages to the outlet openings 47. This fluid pressure level is hereafter referred to as the split point pressure and the coil springs 91 are hereafter referred to as the split point springs 91.

Figure 1B:
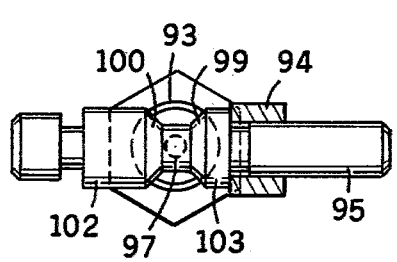
FIG. 1b is a view of a portion of the control valve of FIG. 1.
Figure 5:
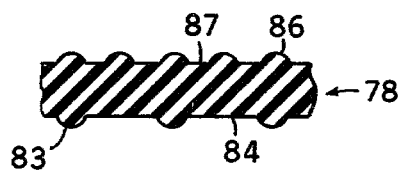
FIG. 5 is a sectional view of the part illustrated in FIG. 3 taken along lines 5—5 thereof.
Figure 6:
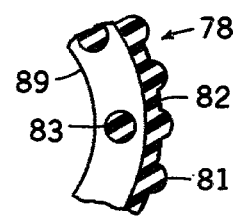
FIG. 6 is a sectional view of a portion of the part illustrated in FIG. 3 taken along lines 6—6 thereof.

Referring also to FIGS. 1b and 2, the control valve 18 also includes a failure warning mechanism, preferably of a well-known type which is similar to that disclosed in U.S. Pat. No. 3,700,286, incorporated herein by reference. The failure warning mechanism includes an electrical switch 93, a centering piston 94, and a switch actuating piston 95. The electrical switch 93 is received in the counterbore 42 and includes an operating member 97 which extends into the bore 33. The centering piston 94 is slidably disposed in the counterbore 34. An O-ring seal 98 is also slidably disposed in the counterbore 34 and engages one end of the centering piston 94. The switch actuating piston 95 is slidably received in the bore 33 and includes opposed cam surfaces 99, 100 for engaging the operating member 97 of the electrical switch 93. The switch actuating piston 95 also includes cylindrical portions 102, 103. An O-ring seal 104 is carried by the switch actuating piston 95 in sealing engagement with the bore 33.

With the O-ring seals 67, 98 and 104 in position, it should be noted that the space where the bores 33, 37 and 42 intersect will be kept free of brake fluid and will be maintained at atmospheric pressure. However, it is possible that a small amount of fluid could leak into that space if, for example, one or more of the O-ring seals 67, 98, 104 become worn. Therefore, a well-known type of weep valve 105 may be installed in the passage 43 to exhaust any leaked fluid to the atmosphere.

OPERATION

Upon actuation of the tandem master cylinder 11 by depressing the brake pedal 12, substantially equal fluid pressure is delivered to the inlet openings 27, 28 of the control valve 18. These substantially equal inlet pressures act on the effective areas of the switch actuating and centering pistons 94, 95 in a manner similar to that described in the aforementioned U.S. Pat. No. 3,700,286 in order to normally maintain the switch actuating piston 95 in the centered position shown in FIG. 1.

During braking, the fluid pressure at the outlet openings 54, 55 of the control valve 18 will increase at the same rate as the fluid pressure at the inlet openings 27, 28 thereof. Thus, the pressure delivered to the front wheel brakes 14, 15 will be equal to the pressure in the master cylinder 11 for the full range of the master cylinder pressure.

The control valve 18 provides open fluid paths for the direct transmission of fluid pressure from the inlet openings 27, 28 to the outlet openings 47 when the valve pistons 63 are in the positions shown in FIG. 1 as already described. During a braking application, these fluid paths remain open with the pressure at the outlet openings 47 increasing at the same rate as the pressure at the inlet openings 27, 28 until the predetermined split point pressure is reached at the inlet openings 27, 28. When the fluid pressure delivered to the inlet openings 27, 28 is then increased due to the continued braking application and attains the predetermined split point value, the valve pistons 63 move inward against the force of the split point springs 91 to positions where the valve heads 73 thereof contact the valve seats 88 of the valve members 78 and thus close the fluid paths. $P_2$ hereinafter refers to the pressure at each of the outlet openings 47. $P_1$ hereinafter refers to the pressure at each of the inlet openings 27, 28 or the pressure in the master cylinder 11.

The predetermined level of split point pressure is dependent upon the force of the split point springs 91 compared to the effective area of the valve pistons 63 acted upon by fluid pressure in a direction opposing the force of the split point springs 91. This effective area is equal to the cross-sectional area of the valve piston end portions 65 since the ends of those portions are sealed off from the inlet fluid pressure ($P_1$) by the O-ring seals 67 while fluid pressure acts against all of the remaining portions of the valve pistons 63. During the lower ranges of master cylinder pressure ($P_1$), the fluid pressure acting on the effective area of each valve piston 63 produces a force thereon which is insufficient to overcome the force of the associated split point spring 91. Assuming that $P_1$ equals the fluid pressure at each of the inlet openings 27, 28, A equals the cross-sectional area of each valve piston end portion 65, and S equals the force of each split point spring 91, then the valve pistons 63 will close the fluid paths (that is, valve heads 73 will move into engagement with valve element seats 88) when $P_1$ times A is greater than S.

After the valve heads 73 close against the valve element seats 88 and the fluid pressure at the inlet openings 27, 28 is further increased by the master cylinder 11, the increased level of fluid pressure will act against each valve piston 63 over an effective circular area having a diameter equal to the main sealing diameter of the valve head 73 thereof (hereinafter referred to as B) less the area A. This produces a force on each valve piston 63 assisting the associated split point spring 91, thereby tending to reopen the valve piston 63 to deliver at least a portion of this increased fluid pressure to the associated outlet opening 47. However, any of this increased fluid pressure delivered to the outlet opening 47 creates an opposing force on the valve piston 63 acting over the area B. This, of course, tends to reclose the valve pistons 63 against the valve elements 78.

These opposing forces on the valve pistons 63 tend to keep the valve heads 73 closely adjacent to the valve seats 88 for the restricted flow of fluid from the inlet openings 27, 28 to the outlet openings 47 to create a pressure at the outlet openings 47 which increases at a lower rate than the pressure at the inlet openings 27, 28. The ratio of the pressures ($P_1/P_2$) is determined by the relationship of the effective areas (A and B) previously mentioned. After the control valve 18 first closes (i.e. valve heads 73 initially engage valve element seats 88), the increase in pressure at each of the inlet openings 27, 28 (hereinafter referred to as $\Delta P_1$) will produce an increase in pressure at each of the outlet openings 47 (hereinafter referred to as $\Delta P_2$) in accordance with the following formula: $\Delta P_1 B - A/B = \Delta P_2$.

Similarly, assuming $P_2$ is the pressure at each of the outlet openings 47, then $P_2(B) = P_1(B - A) + S$ after the valve pistons 63 become operative (i.e. after the valve heads 73 engage valve seats 88). Accordingly, the fluid pressure delivered to the front wheel brakes 14, 15 will be greater than the fluid pressure delivered to the rear wheel brakes 16, 17 when the master cylinder pressure $P_1$ exceeds the split point pressure. Therefore, the braking effort developed by the rear wheel brakes 16, 17 will be reduced, thereby preventing premature rear wheel lock.

During that portion of a brake application in which the applied pedal effort is reduced subsequent to a pedal effort of sufficient intensity to have moved the valve pistons 63 to their restricted flow positions, $P_1$ acting on the area $B - A$ of each valve piston 63 is reduced. Thus, the forces tending to move the valve pistons 63 outwardly toward the outlet openings 47 are reduced, and each valve piston 63 moves inwardly under the influence of the pressure at the associated outlet opening 47 ($P_2$) acting on the area B thereof. As the valve pistons 63 move inward, their valve heads 73 slide within the inner peripheral surfaces 89 of the valve elements 78, thereby increasing the available volume for the fluid at the rear wheel brakes 16, 17 and thereby accomplishing a reduction in $P_2$. The valve pistons 63 will continue their inward movement in an effort to reduce $P_2$ to satisfy the previously mentioned formula: $P_2(B) = P_1(B - A) + S$.

However, the valve pistons 63 may not completely achieve this result because of their limited possible inward travel. During the descent in brake pressure, the pressure at the outlet openings 47 can never be greater than the pressure at the inlet openings 27, 28. This is because the fluid at the outlet openings 47 is able to flow around the valve elements 78 between the lips 79 and the walls of the cavities 30 if the fluid pressure in the cavities 30 is at a lower level. The lips 79 of the valve elements 78 accordingly function as relief valves to prevent rear brake pressure ($P_2$ at outlet openings 47) from ever being greater than front brake pressure ($P_1$ at master cylinder 11 or inlet openings 27, 28).

When the pressure at the inlet openings 27, 28 is reduced beneath the level at which the control valve 18 originally closed the fluid paths to the outlet openings 47, the valve pistons 63 will be urged outwardly by the split point springs 91 to reopen the fluid passages between the valve heads 73 and valve seats 88.

The following description is concerned with the operation of the control valve 18 when a failure occurs in one of the branches of the brake system portion 10.

In the event of a failure (e.g. a pressure leak) in the branch of the brake system portion 10 which includes the conduits 19, 21, 23, the front wheel brake 15 and the rear wheel brake 17, the pressure at the inlet opening 27 of the control valve 18 due to a braking application will be eliminated or significantly reduced relative to the pressure at the inlet opening 28 thereof. Then, the greater pressure at the inlet opening 28 acting on the switch actuating piston 95 will cause rightward movement thereof in FIG. 1 to a translated position where its cylindrical portion 102 engages the valve piston end portions 65 thus maintaining the valve pistons 63 in the positions shown in FIG. 1. This provides open fluid paths through the control valve 18 from the inlet openings 27, 28 to the outlet openings 47. Thus, the pressure subsequently delivered to the other rear wheel brake 16 through the conduit 24 in the intact branch of the brake system portion 10 will be equal to the pressure in the master cylinder 11 for the full range of master cylinder pressure. The rear wheel brake 16 is therefore capable of developing the maximum braking effort for vehicle emergency braking. The rightward movement of the switch actuating piston 95 moves the operating member 97 of the electrical switch 93 rightward in FIG. 2 to its circuit making position to complete the driver warning circuit and light a driver warning lamp (not shown).

Conversely, in the event of a failure (e.g. a pressure leak) in the branch of the brake system portion 10 which includes the conduits 20, 22, 24, the front wheel brake 14, and the rear wheel brake 16, the pressure at the inlet opening 28 of the control valve 18 due to a braking application will be eliminated or significantly reduced relative to the pressure at the inlet opening 27 thereof. Then, the greater pressure at the inlet opening 27 acting on the switch actuating piston 95 will cause leftward movement thereof in FIG. 1 to a translated position where its cylindrical portion 103 engages the valve piston end portions 65 thus maintaining the valve pistons 63 in the positions shown in FIG. 1. This provides open fluid paths through the control valve 18 from the inlet openings 27, 28 to the outlet openings 47. Thus, the pressure subsequently delivered to the other rear wheel brake 17 through the conduit 23 in the intact branch of the brake system portion 10 will be equal to the pressure in the master cylinder 11 for the full range of master cylinder pressure. The rear wheel brake 17 is therefore capable of developing the maximum braking effort for vehicle emergency braking. The leftward movement of the switch actuating piston 95 also causes the driver warning lamp (not shown) to light in the manner as previously described.

An advantage of the present invention is that the switch actuating piston 95 provides a means for precluding the pressure limiting operation of the control valve 18 in the event of partial brake system failure without utilizing sealing members to open and close bypass passages between the inlet openings 27, 28 and the outlet openings 47.

It will be understood that the claims are intended to cover all modifications and variations of the preferred embodiment of the invention, herein chosen for the purpose of illustration, without departing from the spirit and scope of the invention.

I claim:

1. The control valve for a vehicle hydraulic dual brake system of the type including a tandem master cylinder having first and second separated portions for supplying fluid pressure to first and second separated wheel brakes, respectively, through first and second separated fluid branches, respectively, said control valve comprising:
   (a) a housing;
   (b) first and second inlets in said housing for connection to said first and second tandem master cylinder separated portions, respectively;
   (c) first and second outlets in said housing for connection to said first and second separated wheel brakes, respectively;
   (d) a first cavity in said housing connected between said first inlet and said first outlet;
   (e) first valve means in said first cavity disposed in said first fluid branch for transmitting fluid pressure at said first inlet to said first outlet, said first valve means including a valve piston movable between an open position and a closed position for limiting the pressure transmitted to said first outlet relative to the pressure at said first inlet only when the pressure at said first inlet is above a single predetermined level;
   (f) a second cavity in said housing connected between said second inlet and said second outlet;
   (g) second valve means in said second cavity disposed in said second fluid branch for transmitting fluid pressure at said second inlet to said second outlet, said second valve means also including a valve piston movable between an open position and a closed position for limiting the pressure transmitted to said second outlet from said second inlet only when the pressure at said second inlet is above said single predetermined level;
   a bore in said housing connected between said first and second inlets; and
   (i) a shuttle piston movable in said bore having first and second ends acted upon by the fluid pressure at said first and second inlets, respectively, for effecting movement of said piston from a normally centered position where it has no engagement with said valve pistons into one of two opposed translated positions where it is positioned for simultaneously engaging and holding said valve pistons in their open positions when a failure occurs in one of said first and second fluid branches at any level of master cylinder operating pressure.

* * * * *